United States Patent
Cavanagh et al.

(10) Patent No.: US 9,760,608 B2
(45) Date of Patent: Sep. 12, 2017

(54) REAL-TIME SEARCH TUNING

(71) Applicant: Microsoft Technology Licensing, LLC, Redmond, WA (US)

(72) Inventors: Gary Liam Cavanagh, Sammamish, WA (US); Pablo Martin Castro, Redmond, WA (US); Eugene Shvets, Seattle, WA (US); Nikhil Kothari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 14/070,004

(22) Filed: Nov. 1, 2013

(65) Prior Publication Data
US 2015/0127637 A1    May 7, 2015

(51) Int. Cl.
*G06F 7/00*    (2006.01)
*G06F 17/30*    (2006.01)

(52) U.S. Cl.
CPC .... *G06F 17/3053* (2013.01); *G06F 17/30554* (2013.01); *G06F 17/30864* (2013.01); *G06F 17/30867* (2013.01)

(58) Field of Classification Search
CPC ......... G06F 17/30554; G06F 17/30867; G06F 17/3053
USPC ....................................................... 707/723
See application file for complete search history.

(56) References Cited

U.S. PATENT DOCUMENTS

| 7,596,558 B2 | 9/2009 | Brewer et al. |
| 7,739,408 B2 | 6/2010 | Fish et al. |
| 7,783,630 B1 * | 8/2010 | Chevalier ........... G06F 17/3053 707/723 |

(Continued)

FOREIGN PATENT DOCUMENTS

WO    2009146327 A1    12/2009

OTHER PUBLICATIONS

Elser, Jeffrey Kyle, "Search Engine Tuning with Genetic Algorithms", In Master of Science in Computer Science, May 2012, 63 pages.

(Continued)

*Primary Examiner* — Binh V Ho
(74) *Attorney, Agent, or Firm* — Workman Nydegger (57) ABSTRACT

Embodiments are directed to dynamically tuning search result rankings to control how the search results are presented in a user interface and to dynamically updating search result rankings based on tuning inputs. In one scenario, a computer system receives search results with associated search result attributes. The search results are displayed within a user interface according to each search result's determined ranking. The computer system then receives a tuning input at the user interface. The tuning input indicates that a search result ranking model is to be adjusted for various specified search result attributes. Moreover, the search result ranking model determines how each search result is ranked. The computer system then dynamically updates the displayed search results as the search result ranking model is tuned for the specified search result attributes. The dynamic updating includes repositioning, adding and removing search results according to the determined ranking for each search result.

21 Claims, 4 Drawing Sheets

(56) References Cited

U.S. PATENT DOCUMENTS

| | | | | |
|---|---|---|---|---|
| 7,958,143 | B1* | 6/2011 | Amacker | G06F 17/30873 707/736 |
| 8,131,716 | B2 | 3/2012 | Chevalier et al. | |
| 8,166,026 | B1 | 4/2012 | Sadler | |
| 8,762,373 | B1* | 6/2014 | Zamir | G06F 17/30867 707/732 |
| 2004/0260695 | A1* | 12/2004 | Brill | G06F 17/30867 |
| 2005/0071328 | A1* | 3/2005 | Lawrence | G06F 17/30867 |
| 2005/0216434 | A1* | 9/2005 | Haveliwala | G06F 17/30867 |
| 2007/0198506 | A1* | 8/2007 | Attaran Rezaei | G06F 17/30675 |
| 2008/0208808 | A1* | 8/2008 | Sue | G06F 17/30864 |
| 2008/0243830 | A1* | 10/2008 | Abhyanker | G06F 17/30696 |
| 2009/0144262 | A1 | 6/2009 | White et al. | |
| 2009/0198669 | A1* | 8/2009 | Shaw | G06F 17/30864 |
| 2009/0216563 | A1* | 8/2009 | Sandoval | G06F 17/30867 705/3 |
| 2009/0228482 | A1* | 9/2009 | Ye | G06F 17/30864 |
| 2009/0248656 | A1* | 10/2009 | Blinnikka | G06F 17/30867 |
| 2010/0138413 | A1* | 6/2010 | Wu | G06F 17/30867 707/732 |
| 2010/0235340 | A1* | 9/2010 | Todhunter | G06F 17/30867 707/706 |
| 2010/0274783 | A1* | 10/2010 | Chevalier | G06F 17/3053 707/723 |
| 2010/0299336 | A1* | 11/2010 | Bergstraesser | G06Q 30/0256 707/759 |
| 2011/0208822 | A1* | 8/2011 | Rathod | G06Q 30/02 709/206 |
| 2012/0095980 | A1* | 4/2012 | Elyada | G06F 17/30864 707/706 |
| 2012/0221568 | A1* | 8/2012 | Haveliwala | G06F 17/30867 707/732 |
| 2013/0103683 | A1 | 4/2013 | Haveliwala et al. | |
| 2013/0198174 | A1* | 8/2013 | Poznanski | G06F 17/30867 707/723 |
| 2014/0108070 | A1* | 4/2014 | Vernitsky | G06Q 10/025 705/6 |
| 2014/0195525 | A1* | 7/2014 | English | G06F 17/30873 707/722 |

OTHER PUBLICATIONS

"Solr Lucene Relevancy Tuning", Published on: Jul. 24, 2012, Available at: http://www.searchtechnologies.com/solr-lucene-relevancy.html.

Crossley, et al., "Profiles—Analysis and Behaviour", In BT technology Journal, vol. 21, Issue No. 1, Jan. 2003, pp. 56-66.

"International Search Report and Written Opinion Issued in PCT Application No. PCT/US2014/063466", Mailed Date: Jan. 29, 2015, 12 Pages.

"Second Written Opinion Issued in PCT Application No. PCT/US2014/063466", Mailed Date: Sep. 18, 2015, 7 Pages.

"International Preliminary Report on Patentability Issued in PCT Application No. PCT/US2014/063466", Mailed Date: Jan. 28, 2016, 8 Pages.

* cited by examiner

REAL-TIME SEARCH TUNING

BACKGROUND

Search engines are widely used in today's society. Users typically provide search terms and receive the search results. The results are ranked by the search engine, and are provided to the user according to the ranking. Usually, the highest ranked item (i.e. that item most likely to match the user's search term) is displayed most prominently. Users may then be able to sort these search results from newest to oldest, cheapest to most expensive, closest by to furthest away, etc. The sorting, however, has no effect on how the search results are initially ranked by the search engine.

BRIEF SUMMARY

Embodiments described herein are directed to dynamically tuning search result rankings to control how the search results are presented in a user interface and to dynamically updating search result rankings based on tuning inputs. In one embodiment, a computer system receives search results, where each search result has associated search result attributes. The search results are displayed within a user interface according to each search result's determined ranking. The computer system then receives a tuning input at the user interface. The tuning input indicates that a search result ranking model is to be adjusted for various specified search result attributes. Moreover, the search result ranking model determines how each search result is ranked. The computer system then dynamically updates the displayed search results as the search result ranking model is tuned for the specified search result attributes. The dynamic updating includes repositioning, adding and removing search results according to the determined ranking for each search result.

In another embodiment, a computer system dynamically updates search result rankings based on tuning inputs. The computer system provides search results which are ranked according to a search results ranking model, where each search result has associated search result attributes. The computer system receives a tuning input indicating that the search result ranking model is to be adjusted for specified search result attributes, where the search result ranking model determines how each search result is ranked. The computer system then dynamically updates the provided search results according to the updated ranking based on the tuning input. As such, the user interface that displays the search results is dynamically updated to reflect the changed search results rankings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to dynamically tuning search result rankings to control how the search results are presented in a user interface and to dynamically updating search result rankings based on tuning inputs. In one embodiment, a computer system receives search results, where each search result has associated search result attributes. The search results are displayed within a user interface according to each search result's determined ranking. The computer system then receives a tuning input at the user interface. The tuning input indicates that a search result ranking model is to be adjusted for various specified search result attributes. Moreover, the search result ranking model determines how each search result is ranked. The computer system then dynamically updates the displayed search results as the search result ranking model is tuned for the specified search result attributes. The dynamic updating includes repositioning, adding and removing search results according to the determined ranking for each search result.

In another embodiment, a computer system dynamically updates search result rankings based on tuning inputs. The computer system provides search results which are ranked according to a search results ranking model, where each search result has associated search result attributes. The computer system receives a tuning input indicating that the search result ranking model is to be adjusted for specified search result attributes, where the search result ranking model determines how each search result is ranked. The computer system then dynamically updates the provided search results according to the updated ranking based on the tuning input. As such, the user interface that displays the search results is dynamically updated to reflect the changed search results rankings.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
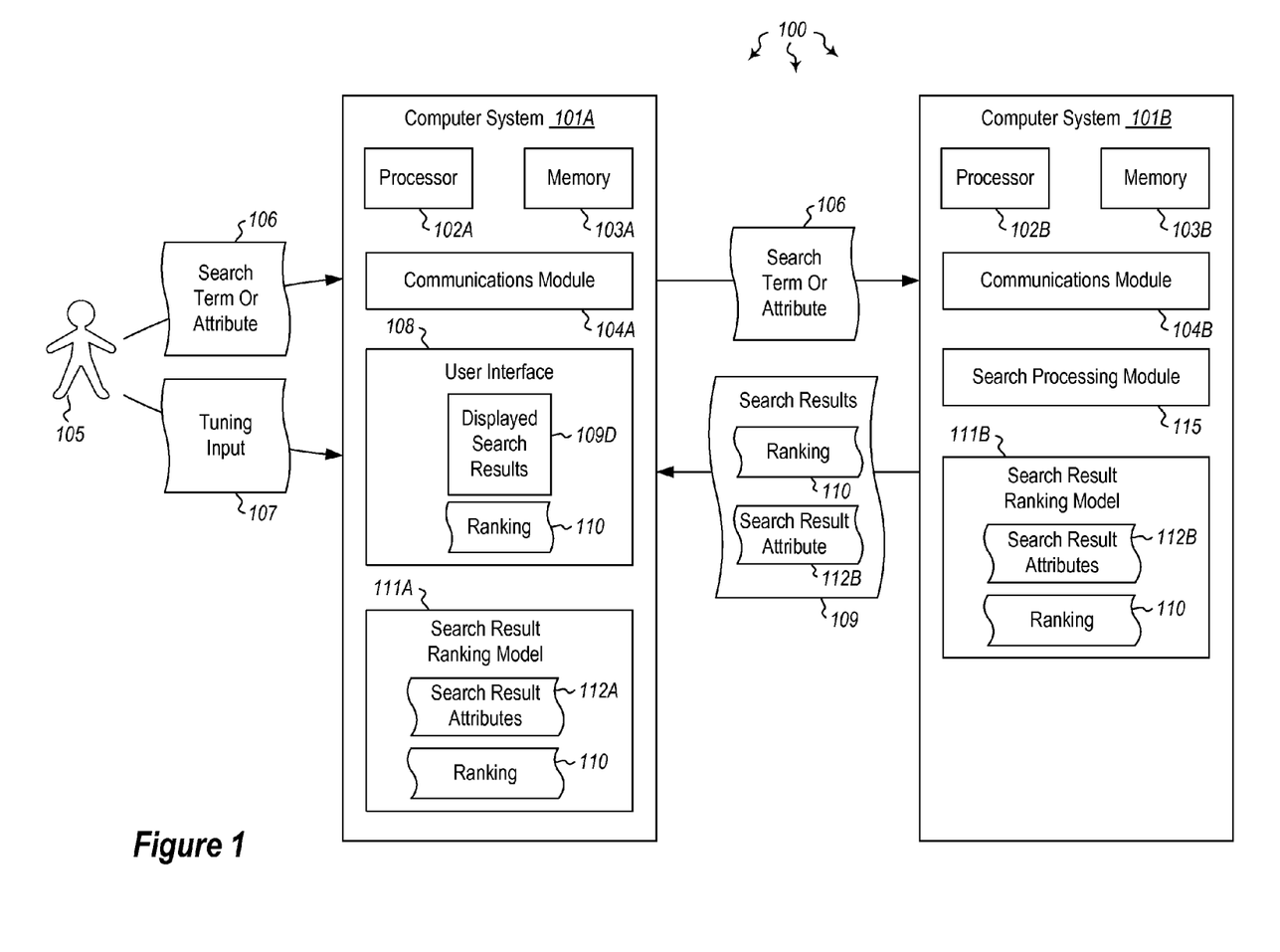
FIG. 1 illustrates a computer architecture in which embodiments described herein may operate including dynamically tuning search result rankings to control how the search results are presented in a user interface.

As illustrated in FIG. 1, a computing system 101A typically includes at least one processing unit 102A and memory 103A. The memory 103A may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103A of the computing system 101A. Computing system 101A may also contain communication channels that allow the computing system 101A to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103A. The system memory may also be referred to as "main memory", and includes memory locations that are addressable by the at least one processing unit 102A over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer systems 101A and 101B. Computer systems 101A and 101B may be any type of local or distributed computer systems, including cloud computing systems. The computer systems 101A and 101B may each be the same type of computer system, or may be different types of computer systems. Each system includes various modules for performing different functions. For example, computer system 101A includes a communications module 104A which receives input from user 105 and passes it on to various internal modules and/or to the communications module 104B of computer system 101B. The communications modules 104A/104B may be used to communicate with substantially any number of other computer systems, using any wired or wireless means of digital or analog communication.

The inputs received by communications module 104A may include search terms or attributes 106. As used herein, the term "attribute" or "search attribute" may include or encompass search terms, but may also include other values or items beyond a simple search term. A "search term", as is generally understood, is a word, phrase, or symbol that is to be searched against a database. For instance, a search term "shoes" may be entered by the user 105, and search results 109 may be returned by computer system 101B after the search processing module 115 has processed the search. The search results may include rankings 110 which may be shown or not shown. In some cases, the search results are displayed to the user in user interface 108 according to the ranking 110 established by the computer system that performed the search (e.g. 101B). Thus, in this example, the search results would include those results that were most relevant to the search term "shoes", with the most relevant result being displayed highest or most prominently in the user interface.

In some embodiments, the searches performed by the user 105 are for web pages, software applications, documents or other internet results. In other cases, the searches may be performed on backend computer systems within a corporation or other entity. In either case, the search results 109 are displayed according to a ranking 110. This ranking may be determined in a variety of different manners, as will be explained further below. Regardless of how the ranking is determined, the user 105 may desire to change the ranking. For instance, user 105 may be the owner or manager of a web site. As an owner or manager, the user would have access to site-related data such as search terms input by the website users. The user may view the search terms, or view the search terms input by the website user that led the website user to the owner/manager's website. The owner/manager 105 may determine that the search results shown to the website user are suboptimal. In response, the owner/manager 105 may wish to change how the search results 109 are ranked and/or how the search results are displayed to the website user.

The owner/manager 105 may thus provide a tuning input 107 that tunes various search result attributes 112A of the search result ranking model 111A. By tuning these search result attributes 112A, the search result ranking model 111A may dynamically re-rank the search results, and the user interface 108 may dynamically update the displayed search results 109D to reflect the new rankings. In such cases, results that showed up high on the list, may drop to lower spots or may disappear entirely from the list of displayed search results. Other search results that were previously not displayed may be brought to the forefront or even the top of the displayed results 109D. This process is referred to as "real-time search tuning" herein.

Real-time search tuning allows users (e.g. website owner/manager 105) to take search results and adjust them based on business or other objectives. For example, an ecommerce retailer may wish to allow website users to search over their product table based on entered search terms. In a tradition search system, results relevant to these terms will be returned. With real-time search tuning, the retailer can tune various search result attributes 112A, including supply weighting boosts in order to change the ranking of the search results. The user interface 108 may include visual dials, slider bars, switches, drop-down boxes, or other means for adjusting search result attribute parameters. As the user adjusts the attribute parameters, the user will be able to (substantially) instantly see, in real-time, the results of these adjustments.

For example, the owner/manager may wish to increase or "boost" the relevancy weighting of a certain product or search result so that higher margin product items appear higher in the search results. Or if the search term 106 matches a certain search result attribute directly or indirectly, to move that search result up or down on the list of displayed search results 108. As such, the user can use various knob, dials or other means (e.g. those shown in the user interface of FIG. 5) to tune search result attributes and see the results of their tuning in real-time, as search results move up or down the list of displayed items, or are added to or removed from the list of displayed items entirely. These concepts will be explained further below with regard to methods 200 and 300 of FIGS. 2 and 3, respectively.

Figure 2:
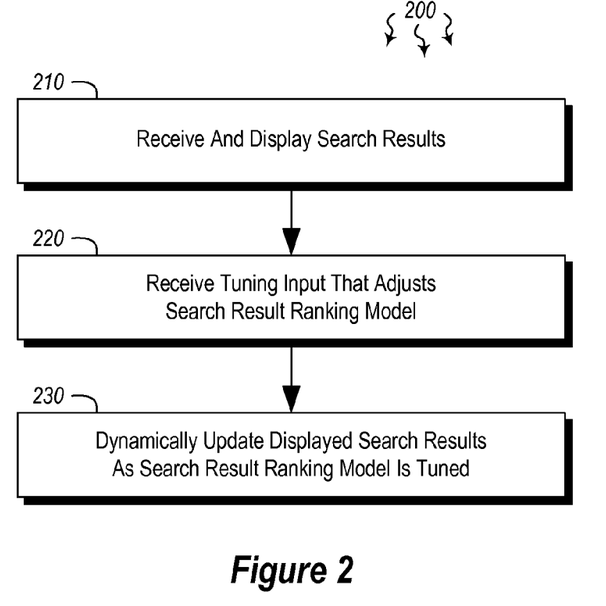
FIG. 2 illustrates a flowchart of an example method for dynamically tuning search result rankings to control how the search results are presented in a user interface.
Figure 3:
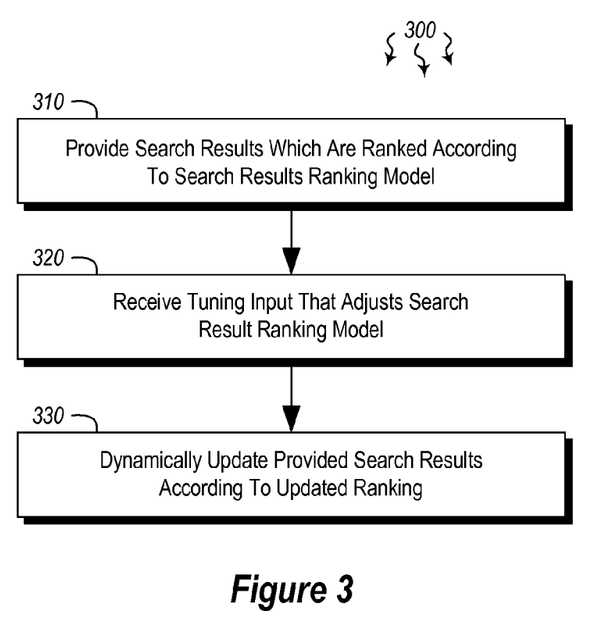
FIG. 3 illustrates a flowchart of an example method for dynamically updating search result rankings based on tuning inputs.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for dynamically tuning search result rankings to control how the search results are presented in a user interface. The method 200 will now be described with frequent reference to the components and data of environment 100.

Method 200 includes an act of receiving one or more search results, the search results being displayed within a user interface according to each search result's determined ranking, each search result having one or more associated search result attributes (act 210). For example, communications module 104A of computer system 101A may receive search results 109 from the communications module 104B of computer system 101B. The search results 109 may be the result of the search processing module 115 having received one or more search terms or attributes 106, and having processed the search. The search results 109 may be displayed in user interface 108 according to ranking 110. The ranking may be determined by the search processing module 115 and/or the search result ranking model 111A/B. At least in some embodiments, the search result ranking model may be on computer system 101A or on computer system 101B. As such, the search result ranking 110 may be modified by the model 111B on computer system 101B, or by the model 111A on computer system 101A.

As mentioned previously, the search result ranking may be associated with the specified search term. Thus, if the user was searching for "rock music", for example, the search processing module 115 may locate bands, albums, songs, or other items related to rock music. The search processing module will then rank the search results 109 according to one or more ranking algorithms. This ranking may then be changed by changing search result attributes 112A within the search result ranking model, as will be explained further below. The search terms or attributes for which the corresponding search result attributes are to be adjusted may be provided by a user, a computer system, a software application or any other entity. Thus, the search may have been performed at the request of another computer system, software application, user or other entity.

Method 200 includes an act of receiving a tuning input at the user interface, the tuning input indicating that a search result ranking model is to be adjusted for one or more specified search result attributes, the search result ranking model determining how each search result is ranked (act 220). Thus, computer system 101A may receive tuning input 107 from user 105 at user interface 108. The tuning input 107 indicates that one or more search result attributes 112A within the search result ranking model 111A are to be adjusted. The adjusting may include increasing or decreasing the importance of a certain term, increasing or decreasing the importance of a certain search result, or type of search results, or changing some other factor. Such factors may be referred to herein as "weighting" factors.

For example, in the scenario described above where a user is searching for rock music, the owner or manager of a music website may wish to increase the weighting for certain search results if the search term or attribute 106 matches certain columns of information. For instance, if the search term "rock music" matches directly to a genre column, search results with the directly matching column would be weighted higher. If the term "rock music" only matched an "album description" column, that search result would be weighted lower. Similarly, if a user was searching for "shoes" on a clothing website, and the owner or manager wanted to increase the weighting for search matches that had a stock surplus, or had a higher margin for the owner, the owner/manager could increase the search result weighting for those items so that they appear higher in the displayed search results 109D in the user interface 108.

Figure 4:
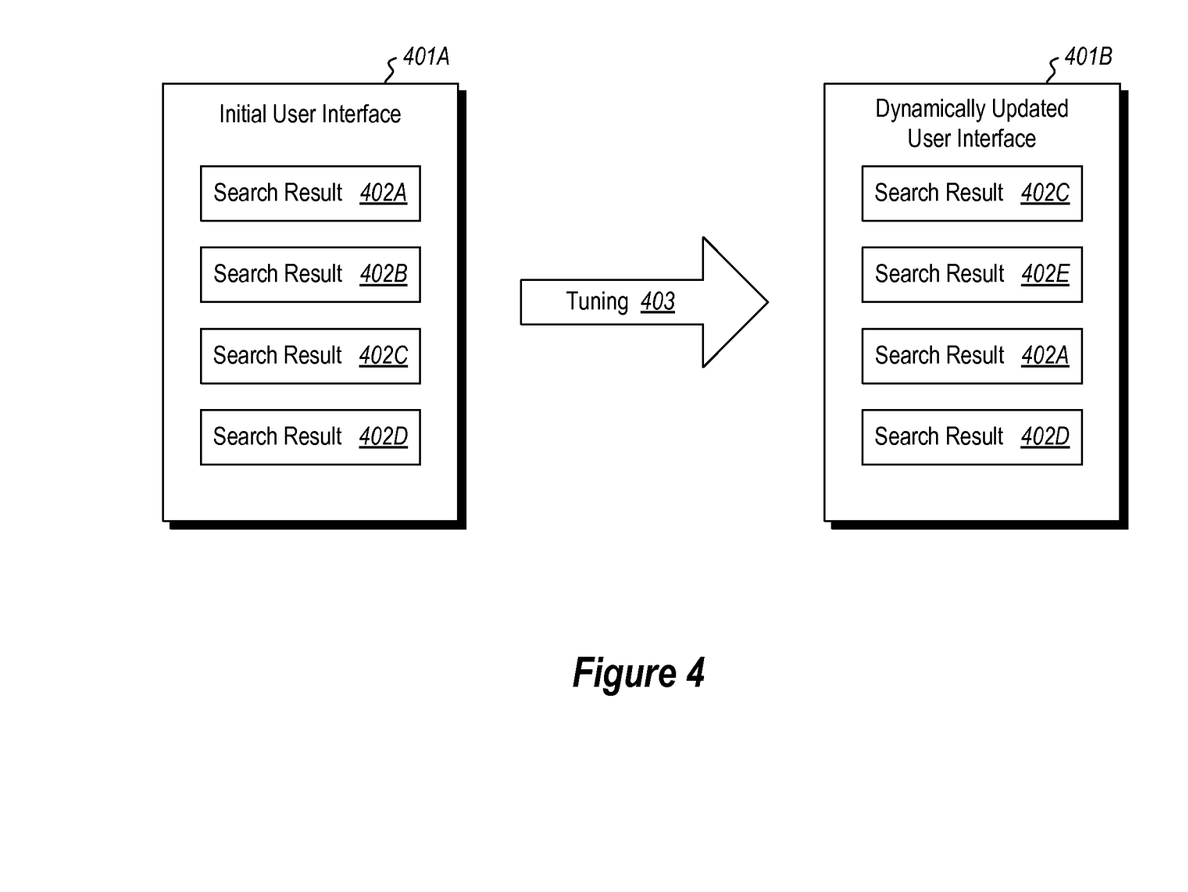
FIG. 4 illustrates an embodiment in which search results are dynamically updated based on a tuning input.
Figure 5:
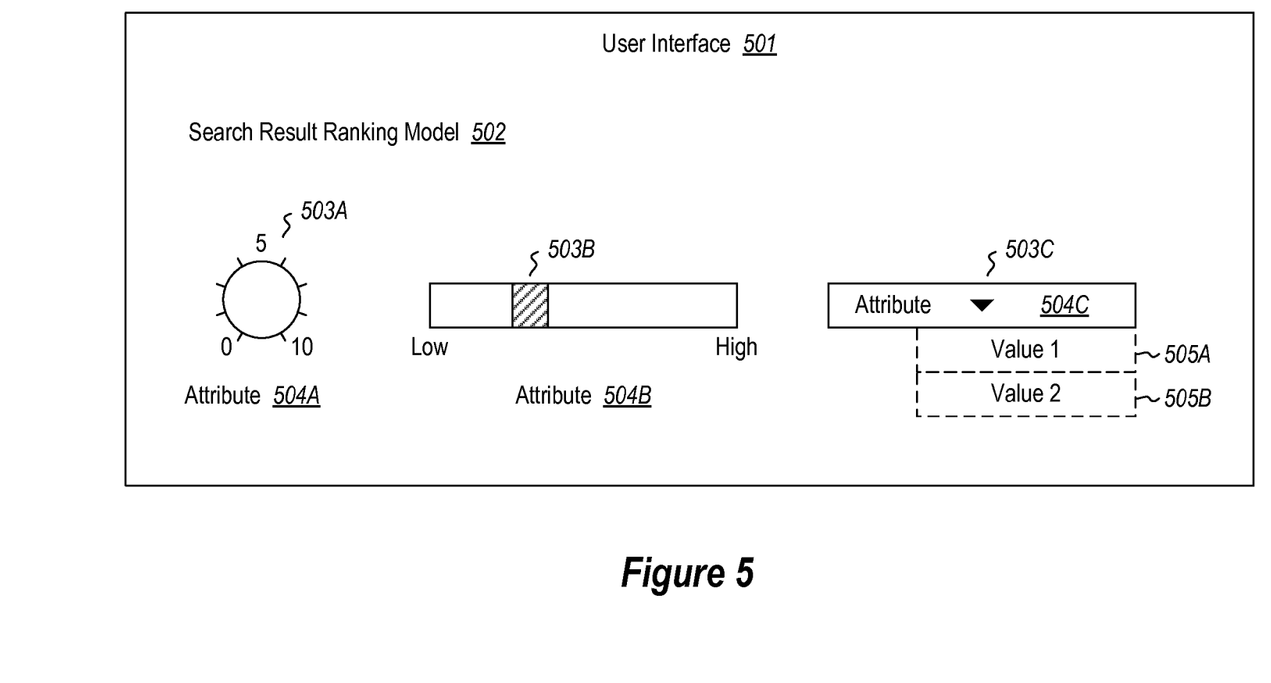
FIG. 5 illustrates an embodiment of a user interface in which controls are provided for providing tuning inputs.

Method 200 further includes an act of dynamically updating the displayed search results as the search result ranking model is tuned for the specified search result attributes, the dynamic updating including at least one of repositioning, adding and removing search results according to the determined ranking for each search result (act 230). Thus, the displayed search results 108 in user interface 108 may be dynamically updated as the search result ranking model 110 is tuned. Accordingly, as shown in FIGS. 4 and 5, a user may use a virtual tuning knob 503A to adjust search result attribute 504A. As illustrated, the knob may be changed from zero to ten, whereby the search results of FIG. 4 may be dynamically updated. For example, search results 402A, 402B, 402C and 402D may be displayed in the initial user interface 401A (i.e. before tuning), and after tuning 403, search result 402C may be moved to the top of the list (i.e. ranked highest), new search result 402E is listed next, search result 402A comes next (after falling two spots), and search result 402D remains in the same position. Accordingly, as the user tunes the knob 503A to adjust search result attribute 503A, search results may be reordered, added or removed from the displayed search results in real time, as the know is moved up or down.

Similarly, slider bar 503B may be used to adjust search result attribute 504B from low to high, and drop-down menu 503C may be used to adjust search result attribute 504C, along with one or more values 505A and/or 505B. The owner or manager of a website or of another data store may thus tweak and change how search results are ranked and ultimately presented to end users. The tuning input (via UI elements 503A-C or via some other text-based or gesture-based control) thus modifies the search result ranking model 111A so that weight is added to or removed from search results according to the tuning input. The search result ranking model 111A itself may be configured to divide the search result attributes 112A into weights and scoring functions, and further divide the scoring functions into various measures including freshness, distance, magnitude, tags or other measures that are used in forming or modifying the ranking 110.

Some embodiments may allow users (e.g. data owners or managers) to store sets of search result ranking model settings as a tuning profile. This tuning profile may correspond to a specified search term or attribute 106. As such, when that search term or attribute is received at the computer system, the search result ranking model settings of that profile will automatically be applied. Thus, using an example from above, if a website owner has created a settings profile for the search term "shoes", whenever a website user enters the search term "shoes", the owner's created settings profile (i.e. the tuning profile) for that search term will be applied to the search results, and the search results will be ranked according to the tuning profile. While the tuning profile may correspond to a specific search term or attribute, a tuning profile may correspond to and be applied to searches provided by certain users, certain groups of users, certain groups of search terms, or to other designated entities. Thus, when search terms are received from that user or group of users or is part of a specified group of search terms, the profile (or profiles) corresponding to that group will be applied automatically within the search result ranking model 111A, and the displayed search results 109D will be displayed according to the settings provided in the appropriate profile.

Turning now to FIG. 3, a flowchart is illustrated of a method 300 for dynamically updating search result rankings based on tuning inputs. The method 300 will now be described with frequent reference to the components and data of environment 100 of FIG. 1.

Method 300 includes an act of providing one or more search results, the search results being ranked according to a search results ranking model, each search result having one or more associated search result attributes (act 310). Thus, search processing module 115 of computer system 101B may provide search results 109 which are ranked according to ranking 110. Method 300 next includes an act of receiving a tuning input indicating that the search result ranking model is to be adjusted for one or more specified search result attributes, the search result ranking model determining how each search result is ranked (act 320). The tuning input 107 may be received from computer system 101A or directly from user 105. The tuning input specifies which search result attributes 112B are to be adjusted within the search result ranking model 111B. Method 300 further includes an act of dynamically updating the provided search results according to the updated ranking based on the tuning input, such that the user interface displaying the search results is dynamically updated to reflect the changed search results rankings (act 330). In this manner, the computer system 101B may continually provide the user interface 108 with dynamically updated, properly ranked search results.

In some embodiments, a user (e.g. data owner/manager 105) makes a search request from a client side application (having a user interface which may be the same as or different than user interface 108). This request goes to a backend server (e.g. computer system 101B) which receives this request and passes it on to the search result ranking model 111B. At least in some cases, the search request may be handled in a default manner in which no custom tuning of the search index is performed, so that the request is processed according to the search processing module's ranking algorithms.

The search results are passed back from the search processing module 115 to the client side application where the results are then displayed to the user in user interface 108. An owner, manager or administrator who wants to "tune" the search results ranking 110 may tune search result attributes 112B directly, or may configure tuning profiles for a given search term or attribute. In the user interface 108, the administrator or other user may enter in a search term that they wish to tune. This tuning request is sent to computer system 101B which receives this request and passes it on to the search result ranking model 111B. The search result ranking model ranks the search results and sends the results 109 to the computer system 101A where they are displayed, along with various controls (as shown in FIG. 5) for tuning the search results.

Each time a change is made to the configuration of the tuning profile for a given search term or attribute 106, the change is passed to the backend server (e.g. computer system 101B). The administrator, owner or manager may continue to make changes to the tuning profile until they are happy with the results. Once finished tuning, the changes to the tuning profile are saved. From that point on, incoming search terms matching the tuning profile will have the tuning profile applied so that the search results are ranked according to the administrator-designed profile. In some cases, intermediate configuration states are possible. These intermediate states allow users to try tuning modifications without having to actually save and/or implement them.

Thus, at least in some embodiments, the user 105 makes a search request from their client side application via user interface 108. This search request goes to the backend server (i.e. computer system 101B) which receives this request and passes it on to the search result ranking model 111B. If a tuning profile corresponding to the search exists and is stored on or accessible by the search result ranking model 111B, the tuning profile will be used to alter the rankings of the search engine results. In some embodiments, the user 105 will provide the name of the tuning profile in the search request. The search results 109 are passed from the backend server to the computer system 101A where they are displayed on the user interface 108. The search results are displayed according to the ranking resulting from the tuning profile applied by the search result ranking model 111B.

The backend server 101B listens for input parameters from the client side user interface 108. These parameters (i.e. tuning input 107) will describe the changes that are to be made to the scoring profiles for the search results. In one example, if the administrator wanted to boost one search field (e.g., Title) higher than another field (e.g., Description) such that when a search term is entered and the search term was found in the Title column, this would give a higher weighted boost to the ranking score applied to that row than if the term was found in the Description field. This allows items that are of more importance to be boosted higher in the search results. In this example, the user interface 108 would visually and dynamically allow the administrator, data owner or manager to choose the columns where this boosting could be applied and the amount at which those columns could be boosted. These tuning parameters may then be sent to the backend server 101B, which would interpret these parameters and convert them into scoring profile expressions that are applied by the search result ranking model dynamically at runtime.

In some embodiments, the tuning parameters are converted into scoring expressions. For each field weight that is specified, a term-query is constructed that includes a weight factor in it. As such, when a search result is found producing a non-zero score, the weighting for that search result is adjusted by the boost factor. The initial score comes from the statistical properties of the data corpus and the search terms. For each scoring function (freshness, magnitude, etc.) the value in the matching document is interpolated into the range provided by configuration, using an easing function also provided by configuration data (e.g. logarithmic, quadratic, linear, constant). The resulting number is a boost factor that is also applied to the search result. Each weighting boost is combined into a final boost or weighting value that is used to adjust the weighting score using an aggregate function such as sum, average, max, etc.

Other examples of scoring profiles that could be tuned with using the user interface 108 include (but are not limited to): "freshness", where newer (or older) search results get a boost relative to the current date, and "magnitude", where documents get a boost when they are closer to one side of the range (e.g. star rating as numbers 1-5, margin as dollar amount or percent amount). Thus, in searches where freshness is large factor, newer search results would receive a weighting boost over older results. Moreover, in searches where magnitude is a factor, search results with a higher star rating (i.e. a higher magnitude) or that provide the retailer with a larger margin (as a dollar amount or percent) would receive an increased weighting boost. It will be understood that while freshness and magnitude are described above as factors in tuning profiles, these are merely two examples among many different factors that could be used to tune search results. Moreover, it will be understood that the user 105 may be able to define and/or select which factors are to be used when tuning a specified set of search results.

When a search term or attribute 106 is entered by a website or other user (e.g. data owner/manager 105), and when the owner/manager has provided a tuning input 107, that tuning input may be mapped to the search algorithms used by the search processing module 115, such that the search is performed using the tuning input, as opposed to applying the tuning input 107 after the search has been performed. In such cases, the search results will be correctly displayed initially, without needing to be arranged according to an updated ranking.

In some embodiments, the backend server (i.e. computer system 101B) may provide suggested changes to a search user based on context information associated with the user. For example, if the user is a returning user, or if the computer system 101B otherwise determines that the user has purchased similar items at another website, for example, the computer system 101B may provide hints or suggested changes to the user to assist the user in providing an optimal search term and/or an optimal tuning input 107. As mentioned above, the tuning input may include defining interpolations for various search result attributes. The interpolations indicate the rate at which search result ranking is to change based on the contents of the search results. This rate of change may be linear, even, logarithmic or some other rate of change. In such cases, the computer system 101B may provide suggestions for a given search term, based on prior tuning inputs and/or previously stored tuning profiles. In some cases, when one search result attribute is changed, other (related or otherwise linked) search result attributes are automatically updated. For instance, if a search result attribute is changed when a tuning input is applied to a value associated with the search term (e.g. search results are tuned to show high-star-value items), other related search result attributes (e.g. freshness) may also be automatically updated. In this manner, a user may be able to dynamically tune search results to achieve a desired search result ranking.

Accordingly, methods, systems and computer program products are provided which dynamically tune search result rankings to control how the search results are presented in a user interface. Moreover, methods, systems and computer program products are provided which dynamically update search result rankings based on tuning inputs.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, cause the computing system to perform the following:
 requesting a search for a first user;
 receiving one or more search results for the search, the search results having been generated and ranked using a search ranking model, the search results being displayed within a user interface to the first user according to each search result's determined ranking, each search result having an associated search result attribute;
 receiving a tuning input at the user interface from the first to create a tuning profile that adjusts the search ranking model, the tuning input indicating that the search result ranking model is to be adjusted for one or more specified search result attributes, the search result ranking model determining how each search result is ranked, wherein the search result ranking model divides the specified search result attributes into weights and scoring functions, and further divides the scoring functions into one or more of freshness, or magnitude, wherein the tuning profile corresponds to a specified search attribute;
 dynamically updating the displayed search results as the search result ranking model is tuned for the specified search result attributes, the dynamic updating including at least one of repositioning, adding or removing search results according to the determined ranking for each search result; and
 causing the tuning profile to be stored and applied to subsequent searches by one or more other users, including users other than the first user, to generate subsequent search results each having a subsequent search result attribute, such that the tuning profile ranks each search result according to the tuned search result ranking model and the specified search result attributes.

2. The computer system of claim 1, the one or more computer-readable storage media having stored thereon computer-executable instructions that, when executed by the one or more processors, cause the computing system to perform the following:
 receiving at least one search attribute at the user interface; and
 sending the received search attribute to a second computer system that is configured to process the search, wherein the search results are received from the second computer system.

3. The computer system of claim 1, wherein the tuning input modifies the search result ranking model such that weight is added to or removed from search results according to the tuning input.

4. The computer system of claim 1, wherein the search results are based on a specified search attribute, and wherein the search result ranking is associated with the specified search attribute.

5. The computer system of claim 4, wherein the tuning input is applied to a value associated with the search attribute.

6. The computer system of claim 1, wherein the user interface provides at least one of a dial or slider bar for tuning the specified search result attributes within the search result ranking model.

7. The computer system of claim 1, the one or more computer-readable storage media having stored thereon computer-executable instructions that, when executed by the one or more processors, cause the computing system to perform the following:
 determining that a search attribute has been received for which the tuning profile has been stored; and accessing the stored tuning profile to apply the stored search result ranking model settings to the received search attribute.

8. The computer system of claim 7, wherein tuning profile is applied to searches received from a specified user or from a specified group of users.

9. The computer system of claim 7, wherein the tuning profile applies to a plurality of different search attributes.

10. The computer system of claim 1, wherein the subsequent searches by one or more other users are provided by at least one of a user, a computer system or a software application.

11. A computer system comprising the following:
one or more processors;
system memory;
one or more computer-readable storage media having stored thereon computer-executable instructions that, when executed by the one or more processors, cause the computing system to perform the following:
  receiving a request for a search from a first user;
  providing one or more search results for the search to the first user, the search results having been generated and ranked using a search ranking model, the search results being ranked according to a search results ranking model, each search result having an associated search result attributes;
  receiving a tuning input from the first user to create a tuning profile that adjusts the search ranking model, the tuning input indicating that the search result ranking model is to be adjusted for one or more specified search result attributes, the tuning input comprising input selecting one or more columns to prioritize over other columns, the search result ranking model determining how each search result is ranked, wherein the tuning profile corresponds to a specified search attribute;
  dynamically updating the provided search results according to the updated ranking based on the tuning input, such that the user interface displaying the search results is dynamically updated to reflect the changed search results rankings;
  storing the tuning profile; and
  applying the tuning profile to subsequent searches by one or more other users, including users other than the first user, to generate subsequent search results each having a subsequent search result attribute, such that the tuning profile ranks each search result according to the tuned search result ranking model and the specified search result attributes.

12. The computer system of claim 11, the one or more computer-readable storage media having stored thereon computer-executable instructions that, when executed by the one or more processors, cause the computing system to perform the following:
  receiving a search attribute for which the search results are to be provided;
  determining that one or more stored tuning profiles is associated with the received search attribute; and
  applying the tuning profiles associated with the received search attribute to the search results resulting from the received search attribute.

13. The computer system of claim 11 the one or more computer-readable storage media having stored thereon computer-executable instructions that, when executed by the one or more processors, cause the computing system to map the tuning input to one or more search algorithms, such that the search is performed using the tuning input.

14. The computer system of claim 11, wherein dynamically updating the provided search results according to the updated ranking comprises at least one of repositioning, adding or removing search results from the user interface according to the determined ranking for each search result.

15. The computer system of claim 11, the one or more computer-readable storage media having stored thereon computer-executable instructions that, when executed by the one or more processors, cause the computing system to provide one or more suggested changes to a search user based on context information associated with the user.

16. The computer system of claim 11, wherein the tuning input defines interpolations for one or more search result attributes, the interpolations indicating the rate at which search result ranking change based on the tuning input.

17. The computer system of claim 11, wherein one or more associated search result attributes are automatically updated upon changing another related search result attribute.

18. At a computer system including at least one processor and a memory, a computer-implemented method for dynamically tuning search result rankings to control how the search results are presented in a user interface, the method comprising:
  requesting a search for a first user;
  receiving one or more search results for the search, the search results having been generated and ranked using a search ranking model, the search results being displayed within a user interface to the first user according to each search result's determined ranking, each search result having an associated search result attribute;
  receiving a tuning input at the user interface from the first user to create a tuning profile that adjusts the search ranking model, the tuning input indicating that the search result ranking model is to be adjusted for one or more specified search result attributes, the tuning input comprising input selecting one or more columns to prioritize over other columns, the search result ranking model determining how each search result is ranked, wherein the tuning profile corresponds to a specified search attribute;
  dynamically updating the displayed search results as the search result ranking model is tuned for the specified search result attributes, the dynamic updating including at least one of repositioning, adding or removing search results according to the determined ranking for each search result; and
  causing the tuning profile to be stored and applied to subsequent searches by one or more other users, including users other than the first user, to generate subsequent search results each having a subsequent search result attribute, such that the tuning profile ranks each search result according to the tuned search result ranking model and the specified search result attributes.

19. A method for dynamically tuning search result rankings to control how the search results are presented in a user interface, the method comprising:
  requesting a search for a first user;
  receiving one or more search results for the search, the search results having been generated and ranked using a search ranking model, the search results being displayed within a user interface to the first user according to each search result's determined ranking, each search result having an associated search result attribute;
  receiving a tuning input at the user interface from the first user to create a tuning profile that adjusts the search ranking model, the tuning input indicating that the search result ranking model is to be adjusted for one or more specified search result attributes, the search result ranking model determining how each search result is ranked, wherein the search result ranking model divides the specified search result attributes into weights and scoring functions, and further divides the scoring functions into one or more of freshness, or magnitude, wherein the tuning profile corresponds to a specified search attribute;

dynamically updating the displayed search results as the search result ranking model is tuned for the specified search result attributes, the dynamic updating including at least one of repositioning, adding or removing search results according to the determined ranking for each search result; and causing the tuning profile to be stored and applied to subsequent searches by one or more other users, including users other than the first user, to generate subsequent search results each having a subsequent search result attribute, such that the tuning profile ranks each search result according to the tuned search result ranking model and the specified search result attributes.

20. A computer program product for implementing a method for dynamically updating search result rankings based on tuning inputs, the computer program product comprising one or more computer-readable storage media having stored thereon computer-executable instructions that, when executed by one or more processors of the computing system, cause the computing system to perform the method, the method comprising:

receiving a request for a search from a first user;

providing one or more search results for the search to the first user, the search results having been generated and ranked using a search ranking model, the search results being ranked according to a search results ranking model, each search result having an associated search result attribute;

receiving a tuning input from the first user to create a tuning profile that adjusts the search ranking model, the tuning input indicating that the search result ranking model is to be adjusted for one or more specified search result attributes, the search result ranking model determining how each search result is ranked, wherein the search result ranking model divides the specified search result attributes into weights and scoring functions, and further divides the scoring functions into one or more of freshness, or magnitude, wherein the tuning profile corresponds to a specified search attribute;

dynamically updating the provided search results according to the updated ranking based on the tuning input, such that the user interface displaying the search results is dynamically updated to reflect the changed search results rankings;

storing the tuning profile; and applying the tuning profile to subsequent searches by one or more other users, including users other than the first user, to generate subsequent search results each having a subsequent search result attribute, such that the tuning profile ranks each search result according to the tuned search result ranking model and the specified search result attributes.

21. A computer system comprising the following:

one or more processors;

system memory;

one or more computer-readable storage media having stored thereon computer-executable instructions that, when executed by the one or more processors, cause the computing system to perform the following:

receiving a request for a search from a first user;

providing one or more search results for the search to the first user, the search results having been generated and ranked using a search ranking model, each search result having an associated search result attribute;

receiving a tuning input from the first user to create a tuning profile that adjusts the search ranking model, the tuning input indicating that the search result ranking model is to be adjusted for one or more specified search result attributes, the search result ranking model determining how each search result is ranked, wherein the search result ranking model divides the specified search result attributes into weights and scoring functions, and further divides the scoring functions into one or more of freshness, or magnitude, and wherein the tuning profile corresponds to a specified search attribute;

dynamically updating the provided search results according to the updated ranking based on the tuning input, such that the user interface displaying the search results is dynamically updated to reflect the changed search results rankings;

storing the tuning profile; and applying the tuning profile to subsequent searches by one or more other users, including users other than the first user, to generate subsequent search results each having a subsequent search result attribute, such that the tuning profile ranks each search result according to the tuned search result ranking model and the specified search result attributes.

* * * * *